United States Patent

[11] 3,589,652

| [72] | Inventor | Charles S. Thompson, Jr.<br>Vincentown, N.J. |
|---|---|---|
| [21] | Appl. No. | 839,878 |
| [22] | Filed | July 8, 1969 |
| [45] | Patented | June 29, 1971 |
| [73] | Assignee | Gulf & Western Industrial Products Company |

[54] AIRCRAFT ARRESTING DEVICE
8 Claims, 6 Drawing Figs.

[52] U.S. Cl. ................................................ 244/110 A, 242/75.2
[51] Int. Cl. ................................................ B64f 1/00
[50] Field of Search ................................................ 244/110; 188/65.4; 242/191, 192, 75.2, 75.42

[56] References Cited
UNITED STATES PATENTS

| 1,317,404 | 9/1919 | Thomas | 242/192 X |
| 2,960,280 | 11/1960 | Connelly et al. | 242/75.2 X |
| 3,215,375 | 11/1965 | Radovitz | 244/110 |
| 3,250,488 | 5/1966 | Prager | 242/75.2 X |
| 3,341,140 | 9/1967 | Kjos | 242/192 X |
| 3,452,945 | 7/1969 | Viegas | 242/75.42 |
| 3,481,565 | 12/1969 | Marcheron | 244/110 |

Primary Examiner—Milton Buchler
Assistant Examiner—Paul E. Sauberer
Attorney—Meyer, Tilberry and Body ABSTRACT: An aircraft arresting device includes a rotatable reel having an elongated flat tape coiled thereon in layer-by-layer convolutions. A concentrated compressive force is applied to the tape layers on the reel to prevent relative slippage between adjacent layers. The concentrated compressive force may be applied by the tape extending from the reel around a guide and back onto the reel for applying a compressive force when the free end of the tape is tensioned during arrestment of an aircraft.

PATENTED JUN29 1971 3,589,652

INVENTOR.
CHARLES S. THOMPSON JR
BY
*Meyer, Tilberry & Body*
ATTORNEYS

AIRCRAFT ARRESTING DEVICE

BACKGROUND OF THE INVENTION

This application pertains to the art of arresting movement of moving bodies and more particularly to arresting a landing aircraft.

The invention is particularly applicable to aircraft arresting devices and will be described with particular reference thereto although it will be appreciated that the invention has broader applications and can be used for arresting other moving bodies.

Prior devices for arresting movement of a landing aircraft have included a rotatable reel having a hub on which an elongated flat tape is coiled in layer-by-layer convolutions. The tape has a free end extending from the reel to connection with a steel cable stretched across a runway. A landing aircraft engages the steel cable and places tension on the free end of the tape to uncoil the tape from the reel. The reel is provided with a brake to retard its rotation. The braking force applied to the reel in turn resists uncoiling of the tape from the reel and places the free end of the tape in tension to arrest movement of a landing aircraft. Such devices are disclosed in U.S. Pats. Re. No. 25,406 and No. 3,142,458 to Byrne et al. and the disclosures of these patents are hereby incorporated into this specification.

In arresting devices of the type described, the tape layers are rather loosely wound upon the reel. That is, it is impractical to place as much tension in the tape when rewinding it upon a reel as when an aircraft is being arrested. An extremely large engine would be required to rotate the reel and rewind the tape if the tape were tensioned to the same degree as it is when an aircraft is arrested. During an arrestment, the tension in the free end of the tape is transmitted to the layers on the reel. This tension tends to make adjacent layers of tape on the reel slip relative to one another. When such slippage occurs during an arrestment, the free end of the tape momentarily goes slack and very little braking force is applied to the aircraft. Once the slippage stops, a highly destructive impact load is applied to the aircraft and to the arresting apparatus. Therefore, it would be desirable to eliminate such slippage of adjacent layers of tape on the reel during arrestment of an aircraft. During arrestment of an aircraft, the tension in the tape places a compressive load on the stacked layers of tape on the reel. This compressive load provides a normal force between adjacent tape layers and the force resisting slippage of adjacent tape layers is this normal force multiplied by the coefficient of friction of the flat surfaces of the tape. As long as the force resisting slippage of adjacent layers is greater than the braking force applied to the reel, no problem is encountered. However, when the force resisting slippage is smaller than the braking force applied to the reel, slippage of adjacent tape layers will occur and the tape will momentarily go slack. Once slippage starts it proceeds very rapidly because the coefficient of sliding friction is less than the coefficient of static friction. Therefore, once slippage starts, the force resisting slippage is less than before slippage had begun. During arrestment of an aircraft, the reel rotates at an extremely high angular velocity. This places the layers of tape on the reel under an extremely high centrifugal force. This centrifugal force acts in an opposite direction to the compressive force applied to the tape layers by the tension in the tape. This tends to create voids between certain adjacent layers of tape on the reel so that there is little or no normal force between two adjacent layers and the force resisting slippage is extremely small. It would be desirable to provide an arresting apparatus of the type described with an arrangement for preventing slippage between adjacent layers of tape coiled upon the reel.

SUMMARY OF THE INVENTION

An aircraft arresting device includes a rotatable reel having a hub upon which an elongated flat tape is coiled in layer-by-layer convolutions. The tape has a free end extending from the reel to a connection with a steel cable stretched across an aircraft runway. A landing aircraft engages the steel cable and places the free end of the tape in tension to uncoil the tape from the reel. A braking force applied to the reel retards its rotation and brings the aircraft to a stop. The tension in the tape applies a compressive force to the coiled layers on the reel. Centrifugal force acting on the tape layers tends to overcome the compressive force. This reduces the force to prevent slippage between adjacent layers of tape on the reel. In order to increase the compressive force on the tape layers, a force applying means is placed in contact with the outer convolution of tape on the reel and applies a concentrated compressive force to the layers of tape on the reel acting radially inward toward the hub of the reel.

In one arrangement, the free end of the tape extends from the reel around guide means and from the guide means back onto the reel before extending to connection with a steel cable. That portion of the tape extending back onto the reel from the guide means defines a load applying portion of the tape. When the tape is placed in tension during arrestment of an aircraft, the load applying portion of the tape acts against the tape layers coiled upon the reel to apply a concentrated compressive force to the layers for resisting slippage of tape layers on the reel. With this arrangement, the compressive force applied to the tape layers on the reel by the load applying portion of the tape is proportional to the tension in the free end of the tape during an arrestment. In this manner, the compressive force varies in accordance with the tension in the tape and always provides a compressive force which is adequate to prevent slippage between adjacent layers of tape on the reel.

In another arrangement, the concentrated compressive force may be applied to the tape layers on the reel by roller means biased into engagement with the outer most convolution of tape on the reel.

In one arrangement, the tape may extend around guide means and back onto the reel in a direction opposite to the coiling direction of the tape layers on the reel. This provides an additional frictional braking force as the load applying portion of the tape moves in a direction opposite to that of the tape being uncoiled from the reel.

It is a principal object of the present invention to prevent slippage between adjacent layers of an elongated flat tape coiled upon a reel in layer-by-layer convolutions during arrestment of an aircraft.

It is another object of the present invention to prevent such slippage by providing a concentrated compressive force to the layers of tape coiled upon the reel.

It is also an object of the present invention to provide such a compressive force by utilizing the tension in the tape itself during arrestment of an aircraft.

It is a further object of the present invention to provide a method of arresting an aircraft in which impact loads on an aircraft and an arresting apparatus are eliminated by preventing slippage of adjacent tape layers coiled upon a reel.

BRIEF DESCRIPTION OF THE DRAWING

The invention may take physical form in certain parts and arrangement of parts, a preferred embodiment of which will be described in detail in this specification and illustrated in the accompanying drawings which form a part hereof.

DESCRIPTION OF THE PREFERRED EMBODIMENTS

Figure 1:
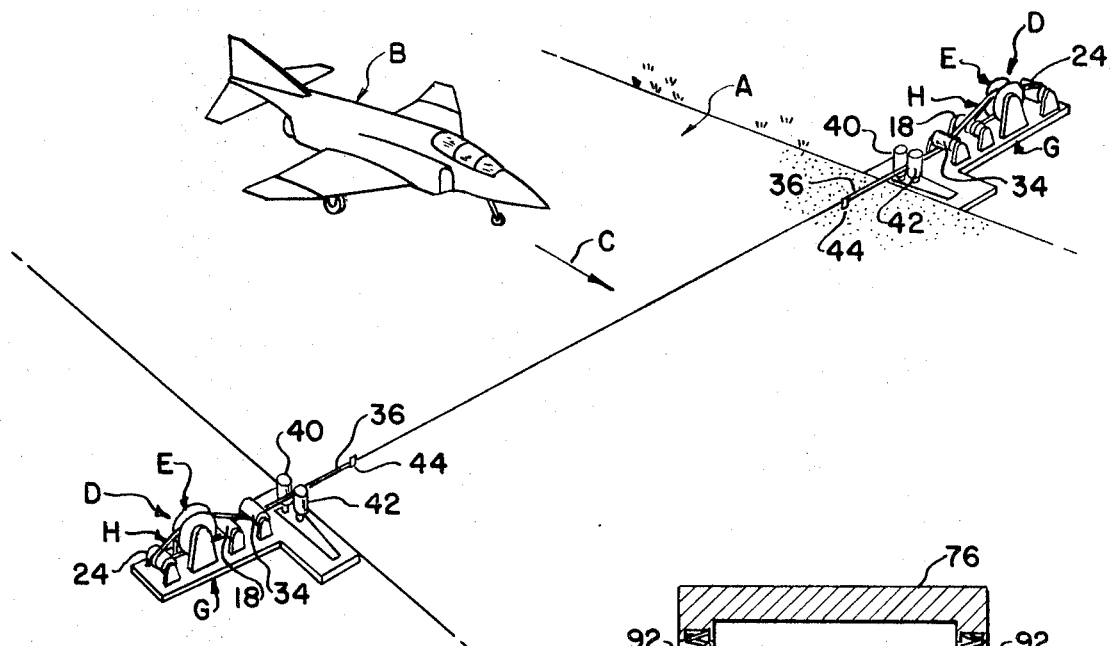
FIG. 1 is a diagrammatic illustration of an aircraft arresting device installed adjacent an aircraft runway and having the present invention incorporated therein.

Referring now to the drawings, wherein the showings are for purposes of illustrating the preferred embodiments of the invention only and not for purposes of limiting same, FIG. 1 shows an aircraft runway A on which an aircraft B may land. Runway A is elongated in the direction of arrow C and aircraft B moves down runway A in the direction of arrow C when landing.

Aircraft arresting apparatus D is installed adjacent opposite side edges of runway A for stopping movement of aircraft B while making a landing. Arresting apparatus B includes rotatable reels E rotatably mounted on supports G.

Figure 2:
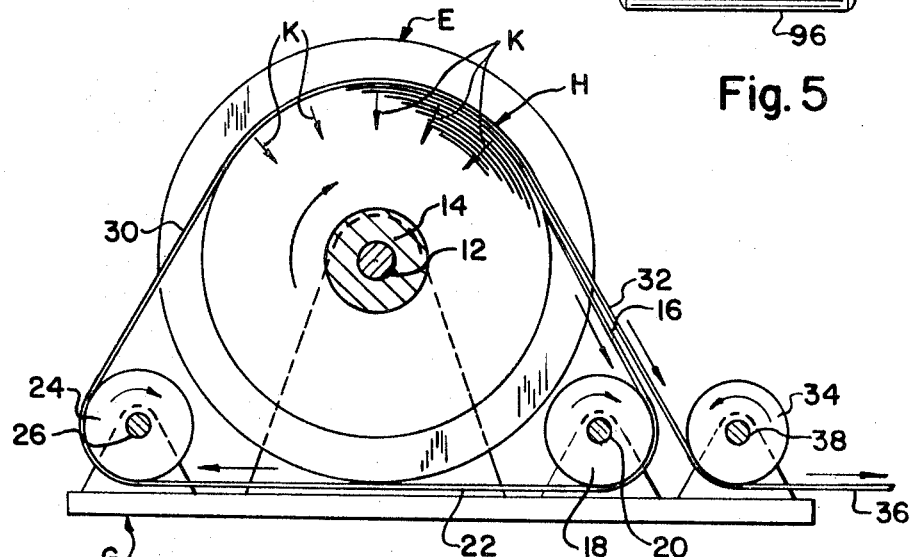
FIG. 2 is a side, elevational cross-sectional view of a rotatable reel having an elongated flat tape coiled thereon in layer-by-layer convolutions and including the compressive force applying means of the present invention.

As shown in FIG. 2, reel E includes a central rotational axis 12 and a hub 14. Tape H extends from reel E as at 16 and is trained around a sheave 18 rotatably mounted on an axis 20 to support G. Tape H then extends from sheave 18 as at 22 over to another sheave 24 which is rotated on axis 26 to support G. Tape H then includes a portion 30 extending from sheave 24 back onto reel E. Tape H then includes another portion 32 extending from reel E beneath sheave 34 and terminates in a free end 36. Sheave 34 is rotated on axis 38 to support G. as shown in FIG. 1, freeend36 of tape H extends between vertical guide sheaves 40 and 42 and is connected as at 44 to a steel cable J which is stretched transversely across runway A. Connections 44 may be of the type disclosed in U.S. Pats. No. 3,195,939; No. 3,264,017; or No. 3,333,310 to LaGarde.

It will be noted that portion 16 of tape H defines the last convolution of tape H on reel E and that this final convolution has an outer exterior surface. Portion 30 of tape H extending from sheave 24 back onto reel E is in contact with the exterior surface of the last convolution of tape on reel E. In the arrangement shown in FIG. 2, tape portion 30 extends back into contact with the last convolution on reel E in the same winding direction as the other convolutions of tape H on reel E. Therefore, when aircraft B engages cable J, terminal end 36 of tape H is tensioned and uncoils tape H from reel E. Portion 30 of tape H which extends back into contact with the tape convolutions on reel E moves in the same direction as the tape being uncoiled from reel E during an arrestment. When reel E rotates and tape H is uncoiled therefrom during arrestment of an aircraft, reel E is braked in a well-known manner and as described in the aforementioned patents to Byrne et al. During an arrestment, the high tension in the tape produces compressive force represented by arrows K in FIG. 2. This compressive force provides a very high normal force between adjacent layers of tape H on reel E so that the frictional force resisting relative slippage between adjacent tape layers is greatly increased. This concentrated compressive force also prevents centrifugal force acting on tape H from creating voids between adjacent layers of tape which may result in slippage. It should be noted that compressive forces K are directly proportional to the tension in free end 36 of tape H so that compressive force K will vary in accordance with the tension in free end 36. This arrangement always provides sufficient compressive force to prevent slippage between adjacent tape layers under varying tension conditions existing in free end 36 of tape H.

Figure 3:
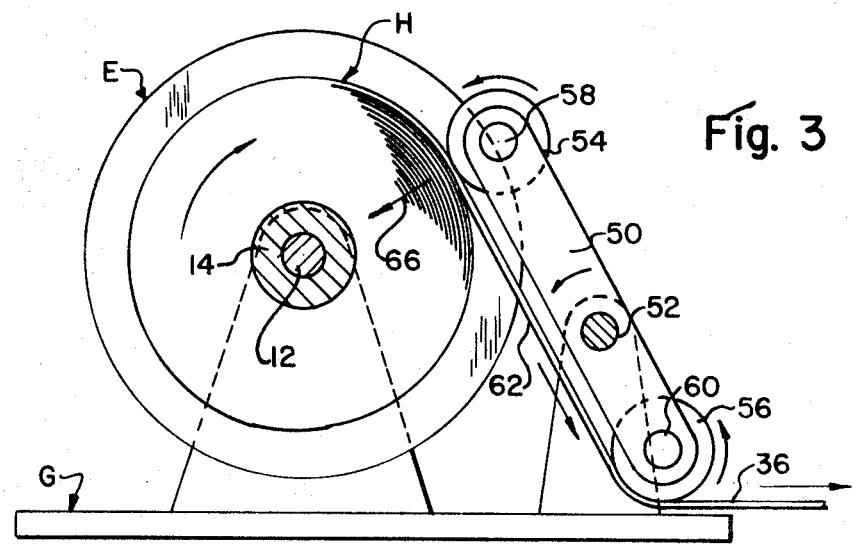
FIG. 3 is a side elevational cross-sectional view similar to FIG. 2 and having a modified compressive force applying means incorporated therein.

FIG. 3 shows another arrangement in which an elongated arm 50 is pivoted on an axis 52 to support G. Arm 50 has rollers 54 and 56 rotatably supported on axes 58 and 60 at its opposite ends. Portion 62 of tape H extends from reel E beneath roller 56 and terminates in free end 36 which is connected to steel cable J in the manner described with reference to FIGS. 1 and 2. Roller 54 is in contact with the final tape convolution on reel E. During an arrestment, free end 36 of tape H is placed under high tension. This tension acts against roller 56 to pivot arm 50 counterclockwise about axis 52 and brings roller 54 into firm engagement with the layers of tape on reel E. Roller 54 then produces a compressive force represented by arrow 66 which acts through all the layers of tape H on reel E radially inward toward hub 14. This increased compressive force increases the frictional force retarding slippage between adjacent layers of tape on reel E. It will be evident that the compressive force 66 will vary in a manner which is proportional to the tension in free end 36 of tape H. In this manner, compressive force 36 will vary in accordance with the tension conditions existing in free end 36 of tape H during an arrestment and compressive force 66 will always be sufficiently great to prevent slippage between adjacent layers of tape on reel E.

Figure 5:
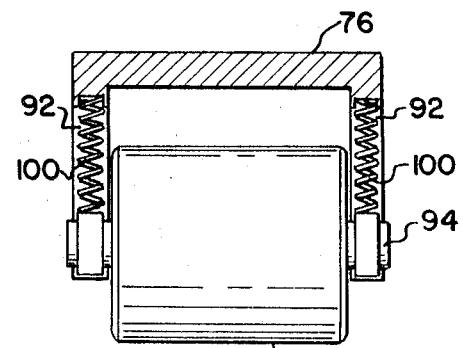
FIG. 5 is a cross-sectional view looking in the direction of arrows 5—5 of FIG. 4.
Figure 4:
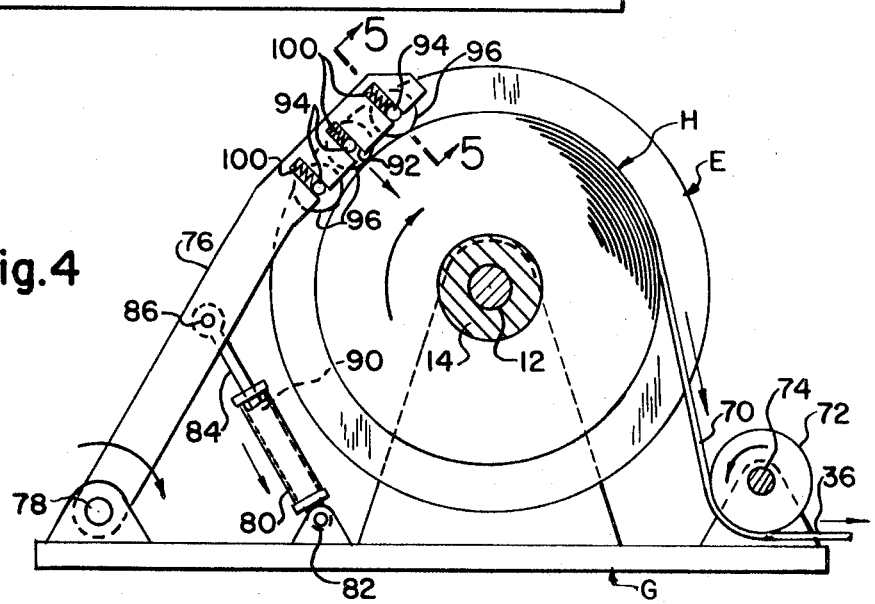
FIG. 4 is a side, elevational cross-sectional view similar to FIGS. 2 and 3 and having another modified compressive force applying means incorporated therein.

FIG. 4 shows another arrangement which is not considered as effective and desirable as the arrangements described with reference to FIGS. 2 and 3, and in which portion 70 of tape H extends from reel E beneath rotatable sheave 72 mounted on axis 74 to support G. Tape H then extends out to a free end 36 in the manner previously described with reference to FIGS. 1 and 2. An elongated arm 76 is pivoted at 78 to support G and an hydraulic cylinder 80 pivotally connected to support G at 82 has its arm 84 pivotally connected to arm 76 at 86. Hydraulic cylinder 80 includes a piston 90 and pressure in cylinder 80 forwardly of piston 90 pivots arm 76 clockwise about axis 78. Arm 76 includes a plurality of transverse slots 92 receiving axis 94 of rollers 96. As shown in FIG. 5, coil springs 100 may act against the top edges of slots 92 and against shaft 94 to bias roller 96 outwardly from arm 76. The ends of shaft 94 may be square to hold shafts 94 against rotation in slots 92 while roller 96 is rotatably mounted on suitable bearings on the central portion of shaft 94. In this arrangement, the plurality of rollers provide a compressive force acting radially inward against the tape convolutions on reel E to prevent relative slippage between adjacent layers of tape H on reel E during an arrestment. The adjustable bias of rollers 96, as explained with reference to FIG. 5, maintains contact between rollers 96 and the tape convolution on reel E as the diameter of tape H on reel E decreases as tape H is uncoiled during arrestment of an aircraft. It is preferred that a plurality of rollers be provided as a single roller provides only a concentrated compressive force on the outermost convolutions of the tape and this force is spread over a wide arc toward hub 14 of reel E.

Figure 6:
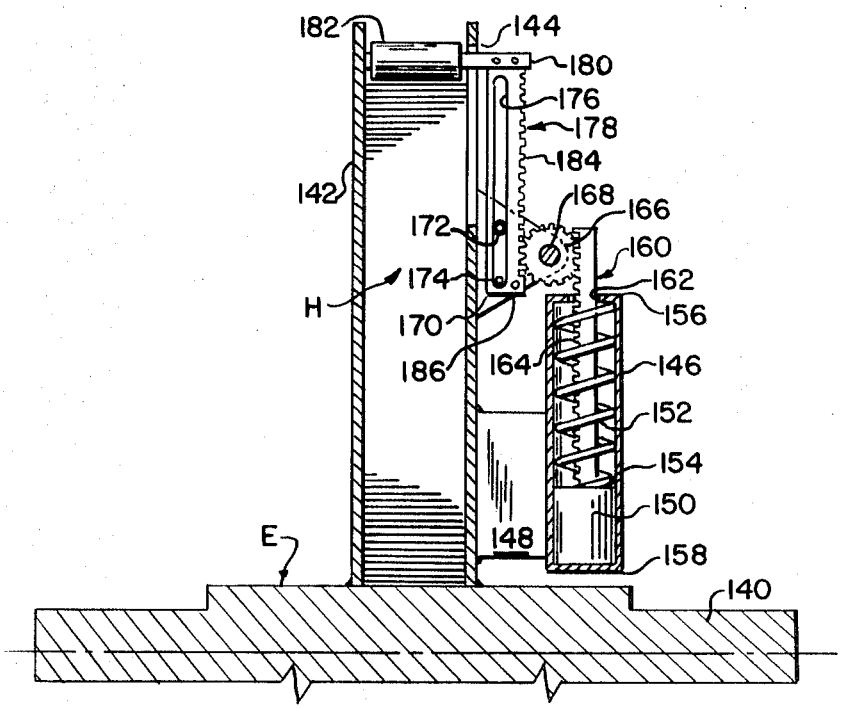
FIG. 6 is a side, elevational cross-sectional view similar to FIGS. 2—4 showing another modified form of force applying means.

In another arrangement, the compressive force applied to the layers of tape on the reel is proportional to the angular velocity of the reel. As shown in FIG. 6, reel E includes rotatable hub 140, and circular disc side plates 142 and 144 welded or otherwise suitably secured to hub 140. A cylinder 146 is welded to bifurcated bracket 148 which in turn is welded to the outer face of sideplate 144 so that cylinder 146 extends radially of the rotational axis of hub 140. A heavy mass 150, such as lead or steel, is in the form of a piston freely slidable in cylinder 146. A coil spring 152 acts against the top face 154 of mass 150 and a top wall 156 of cylinder 146. Spring 152 has sufficient force to move mass 150 against bottom 158 of cylinder 146 when reel E is not rotating regardless of whether mass 150 must be moved in a direction against the force of gravity or with the force of gravity. Mass 150 has an elongated rack 160 secured to top surface 154 thereof in a central location so as to extend centrally through the coils of spring 152. Rack 160 extends through hole 162 in top 156 of cylinder 146. Rack 160 has gear teeth 164 formed transversely thereof along its entire length. A pinion gear 166 is rotatably journaled on shaft 168 between the ears of bracket 170, only one ear of which is shown in FIG. 6. Bracket 170 may be welded to the outer face of side plate 144. The ears of bifurcated bracket 170 has oppositely aligned pairs of holes receiving spaced apart shafts on which rollers 172 and 174 are journaled. Rollers 172 and 174 extend through elongated slot 176 in rack 178 which extends between the ears of bifurcated bracket 170. The top end of rack 178 has one end portion of cantilevered shaft 180 welded thereto. Shaft 180 extends through a radial slot in sideplate 144 with the slot extending radially from hub 140. Shaft 180 has a roller 182 rotatably journaled thereon and positioned between sideplates 142 and 144. Rack 178 has transverse teeth 184 thereon along its entire length. Teeth 184 on rack 178, and teeth 164 on rack 160, drivingly engage with the teeth of pinion 166. With tape H coiled on reel E between sideplates 142 and 144 in layer-by-layer convolutions, the system is ready for arrestment of an aircraft. Arrestment of an aircraft places tension in the free end of tape H and starts reel E rotating to uncoil tape H therefrom. Centrifugal force acts on mass 150 in accordance with the equation $Mrw^2$ in which M is the mass of the material, r is the distance from the rotational axis of hub 140 to the center of mass of mass 150 and $w^2$ is the square of the rotational velocity of reel E in radians per second. Even though the mass of roller 182 and rack 178 are at substantially greater radii from the rotational axis of hub 140 than mass 150 and rack 160, the mass of mass 150 is so great as compared to that of roller 182 and rack 178, and the force of spring 152, that centrifugal force moves mass 150 outwardly in cylinder 146 with substantial force when reel E rotates. In addition, it is sometimes desirable to reverse the position of cylinder 146 shown so that it is outwardly of sideplate 144. In such a condition, spring 152 acts against the bottom end of mass 150 and bottom end 150 of cylinder 146 to move rack 160 to its fully extended position. Movement of mass 150 under centrifugal force then moves rack 160 into cylinder 146 and pulls, rather than pushes, on pinion 160. In such an arrangement, mass 150 is always positioned outwardly from the rotational axis of hub 140 a distance substantially greater than that shown so that the mass of mass 150 need not be so much greater than that of roller 182 and rack 178. Movement of mass 150 radially outward from hub 140 toward top 156 of cylinder 146 causes teeth 164 of rack 160 to rotate pinion 166 counterclockwise. Pinion 166, when rotating counterclockwise, cooperates with teeth 184 of rack 178 to move rack 178 radially inward toward the rotational axis of hub 140. This movement of rack 178 forces roller 182 against the stack of tape H on reel E and roller 182 applies a compressive force to the stack of tape H on roller E acting radially inward toward the rotational axis of hub 140. Thus, roller 182 applies a compressive force to the stack of tape H on reel E with the force being proportional to the angular velocity of reel E. In one arrangement, it is possible to construct spring 152 so that it applied a stronger force against mass 150 as spring 152 is compressed during outward movement of mass 150 in cylinder 146. In such an arrangement it is possible to provide an approximate constant compressive force produced by roller 182 against tape H during an entire arrestment because the greater centrifugal force acting on mass 150 as it moves to a greater radius from the rotational axis of hub 140 it will be opposed by a greater force from spring 152. In any event, the force applied by roller 182 to tape H will still be proportional to the rotational velocity of reel E. It should be recognized that it is possible to provide roller bearings between the exterior surface of mass 150 and the interior walls of cylinder 146 so that unbalanced forces acting against mass 150 due to engagement of rack 160 with pinion 166 will not produce sufficient frictional force between the exterior of mass 150 and the interior of cylinder 146 to prevent movement of mass 150 under action of centrifugal force. In addition, it is possible to duplicate the centrifugal assembly described on side plate 142 so that a rack 178 is connected to each end of shaft 180 so that it is not cantilevered. It is also possible to provide several such assemblies to balance reel E and prevent vibration at high rotational velocities. In addition, it is possible to connect the centrifugal mass with a hydraulic line and cylinder for hydraulically moving roller 182 against the stack of tape H rather than using mechanical connections and movements. In one arrangement it is desirable to provide a lockout so that the centrifugal assembly will be ineffective during rewind. Once an arrestment has been made and rotation of reel E is stopped, spring 152 will return mass 150 to its inserted position in cylinder 146. Cooperation of racks 160 and 178 with pinion 166 will move roller 182 to its radially outwardmost position from the rotational axis of hub 140. At this time, a removable pin 186 may be inserted through holes in the ears of bracket 170 beneath the bottom edge of rack 178 so that rack 178 cannot move radially inward during rewind. Of course, it is possible to omit pin 186 if contact of roller 182 with tape H during rewind is preferable.

While the present invention has been described with reference to a reel rotatably mounted on a horizontal axis it should be recognized that the present invention is equally applicable to reels rotatably mounted on a vertical axis or other sloping axis.

Other arrangements for preventing slippage between adjacent tape layers on a reel are described in two copending patent applications of Charles S. Thompson, Jr. entitled "aircraft arresting device" and filed on the same day as the present application. These other applications are identified by docket Nos. 839,870 and 839,989, and the disclosure of said other applications is hereby incorporated by reference into this application.

While the invention has been described with reference to a preferred embodiment, it is obvious that modifications and alterations will occur to others on the reading and understanding of this specification.

Having thus described my invention, I claim:

1. An aircraft arresting device including a rotatable reel having an elongated flat tape coiled thereon in layer-by-layer convolutions including an outer convolution having an exterior surface, said tape having a free end extending from said reel and being placed in tension to uncoil said tape from said reel in arresting an aircraft, and force applying means contacting said exterior surface of said outer convolution and applying a compressive force to said tape on said reel when said free end is placed in tension to uncoil said tape from said reel in arresting an aircraft.

2. The device of claim 1 wherein the compressive force applied to said tape on said reel is proportional to the tension in said free end of said tape during an aircraft arrestment.

3. The device of claim 1 and further including tape guide means positioned adjacent said reel, said free end of said tape extending from said reel around said guide means, said tape extending from said guide means back around said reel in contact with said exterior surface of said outer convolution to define a load applying portion of said tape, said load applying portion defining said force applying means, said load applying portion applying a compressive force to said outer convolution when said free end of said tape is placed in tension during an aircraft arrestment.

4. The device of claim 3 wherein said tape extends from said guide means back around said reel in the same coiling direction as said outer convolution.

5. The device of claim 1 wherein said reel has a rotational axis and a plane extending through said axis divides said reel into first and second portions, first guide means positioned adjacent said reel at one of said first and second portions, second guide means positioned adjacent said reel at said one portion, said tape extending from said reel around said first guide means then back onto said reel and then around said second guide means to connection with engagement means for engagement with an aircraft.

6. The device of claim 1 wherein said force applying means applies a compressive force proportional to the angular velocity of said reel when said reel is rotated and said tape is uncoiled therefrom during arrestment of an aircraft.

7. The device of claim 1 wherein said force applying means is responsive to centrifugal force to apply said compressive force to said tape on said reel when said reel is rotated and said tape is uncoiled therefrom during arrestment of an aircraft.

8. A method of arresting an aircraft comprising the steps of engaging an aircraft with engagement means connected with the free end of a flat elongated tape extending from a rotatable reel on which the tape is stored in layer-by-layer convolutions, placing the free end of the tape in tension to uncoil the tape from the reel, and applying a concentrated compressive load to an arcuate portion of the tape convolutions on the reel to prevent relative slippage of adjacent tape layers on the reel during aircraft arrestment.